United States Patent [19]

Presby

[11] Patent Number: 5,757,987
[45] Date of Patent: May 26, 1998

[54] ACOUSTO-OPTIC MODULATOR FOR OPTICAL WAVEGUIDES

[75] Inventor: Herman Melvin Presby, Highland Park, N.J.

[73] Assignee: Lucent Technologies Inc., Murray Hill, N.J.

[21] Appl. No.: 798,397

[22] Filed: Feb. 7, 1997

[51] Int. Cl.$^6$ ............................................. G02B 6/10
[52] U.S. Cl. ............................................. 385/7
[58] Field of Search ........................ 385/2, 3, 4, 5, 385/6, 7, 8, 9, 10, 129, 130, 131

[56] References Cited

U.S. PATENT DOCUMENTS

| | | | |
|---|---|---|---|
| 4,092,060 | 5/1978 | Nunoshita et al. | 385/7 |
| 4,735,476 | 4/1988 | Heffner et al. | 350/96.13 |
| 4,900,113 | 2/1990 | Hatori | 385/7 |
| 4,991,923 | 2/1991 | Kino et al. | 350/96.15 |
| 5,351,318 | 9/1994 | Howell et al. | 385/3 |

OTHER PUBLICATIONS

D.B. Patterson, et al. "Noninvasive Switchable Acousto-Optic Taps for Optical Fiber", *J. Of Lightwave Technology*, vol. 8, No. 9, pp. 1304–1312, (1990).

H.F. Taylor, "Acoustooptic-Modulators for Single-Mode Fibers", *J. Of Lightwave Technology*, vol. LT-5, No. 7, pp. 990–992 (1987).

C.S. Tsai, *Guided Wave Acousto-Optics-Interactions, Devices, and Applications*, Ch. 6, pp. 205–231 (Springer-Verlang, N.Y. 1990).

*Primary Examiner*—John Ngo
*Attorney, Agent, or Firm*—Robert E. Rudnick

[57] ABSTRACT

An acousto-optic modulator arrangement includes an optical waveguide, such as an optical fiber, coupled to a substrate having an acoustic transducer formed thereon, by an acoustically-compatible solder composition. An acoustically-compatible solder composition provides advantageously low power reflections at the substrate-solder and solder-optical waveguide interfaces for acoustic waves generated by the transducer. Such propagated acoustic waves are then useable to modulate a light signal propagating through the waveguide by an acousto-optic effect with an advantageous modulation efficiency.

14 Claims, 3 Drawing Sheets

ACOUSTO-OPTIC MODULATOR FOR OPTICAL WAVEGUIDES

FIELD OF THE INVENTION

The invention relates to optical signal modulators.

BACKGROUND OF THE INVENTION

Optical transmission and processing systems are being implemented for use in various communication applications. For example, telephone and data transmission systems are now in use that utilize optical fibers to transmit voice and data signals over long distances. In such systems, data and/or digitized voice signals are modulated with an optical carrier signal for transmission. Modulation is the variation of a characteristic of a signal wave in accordance with a characteristic of another signal wave.

In conventional transmission systems, electrical signals are modulated by an electrical circuit and the resulting modulated electrical signal is provided to a light transmitter for launching a corresponding modulated light signal on an optical fiber. However, such modulation technique is undesirable when the signal to be modulated is an optical signal. In order to modulate optical signals according to this technique, an optical fiber is cut into two respective lengths and an electro-optical modulation device is inserted between the cut-ends of such optical fiber lengths. In operation, the optical signal propagating in one optical fiber length is converted to an electrical signal, modulated and reconverted to a modulated optical signal by the device for transmission over the other optical fiber length. However, such an invasive device is typically difficult to install and often introduces undesirable reliability problems.

H. Taylor, "Acoustooptic Modulators for Single-Mode Fibers", *J. of Lightwave Technol.*, vol. 5, no. 7, pp. 990–992 (1987), describes a non-invasive modulation technique that directly modulates a light signal propagating in an optical fiber. In accordance with this modulation technique, a zinc oxide coating is directly deposited on an optical fiber. Electrodes are then attached to the deposited coating. The electrodes provide RF excitation causing the coating to produce acoustic waves that propagate into the optical fiber. Such acoustic-waves interact with and phase modulate a light signal propagating in the optical fiber by an acousto-optic effect. However, coating of individual optical fibers during the installation or modification of typical optical transmission systems as well as the attaching of the associated electrodes is very difficult.

U.S. Pat. No. 4,991,923, entitled "Acousto-Optic Modulator For Optical Fibers Using Hertzian Contact with a Grooved Transducer Substrate" to Kino et al. (Kino et al. patent), which is incorporated by reference herein, describes a non-invasive component that is attachable to an optical fiber for modulating a light signal propagating therein. A modulator arrangement 500 according to this patent is illustrated in FIG. 1. The arrangement 500 includes an acoustic transducer 510 formed on a top surface 522 of a glass substrate 520. A bottom surface 524 of the substrate 510 has a precision-formed groove 540 with an exact radius. This groove radius is precisely formed to provide a Hertzian contact between an optical fiber 530 and the substrate groove 540, when the fiber 530 is pressed into the groove 540.

A Hertzian contact results when two rigid bodies are forced together into a point or line contact. When the fiber 30 is pressed into the groove 540, the stress in the region of the resulting contact causes elastic deformations proximate the groove 540 bringing the bodies 520 and 530 into hard contact with no gaps. A Hertzian contact enables propagation of acoustic or standing waves over an acoustic path formed entirely of solid material from the substrate 520 through the Hertzian contact interface and into the waveguide 530.

In operation, acoustic waves generated by the transducer 510 propagate into the substrate 520, through the formed Hertzian contact, and into the optical fiber 530. These acoustic waves then interact and modulate an optical signal propagating in a core of the optical fiber 540 by an acousto-optic effect. If the substrate surface 522 is parallel to the substrate groove 540 such that acoustic waves strike the fiber 530 in a perpendicular manner, then a propagating light signal in the fiber 530 is phase modulated. However, if the surface 522 is at non-zero angle θ relative to the length of the fiber 530, then generated acoustic waves would strike the fiber 530 at an angle of incidence (90°-θ). At particular incidence angles θ, it is possible to produce an intensity modulation of the light signal propagating in the optical fiber by an acousto-optic effect.

Although the Kino et. al. patent provides a non-invasive method of modulating signals in an optical fiber, fabrication cost of the substrate and the required precision in forming the groove is undesirably high. Moreover, it is often difficult to produce the required Hertzian contact without forming minor gaps between the groove surface and the fiber along the groove length. Such gaps cause reflections and drastically limit the energy of an acoustic wave propagating into the fiber which limits the corresponding modulation efficiency.

Thus, a need exists for a non-invasive modulation component that is easily attachable to an optical fiber at low cost while maintaining advantageous modulation efficiency.

SUMMARY OF THE INVENTION

The invention is an acousto-optic modulator arrangement with an optical waveguide coupled to a substrate having an acoustic transducer formed thereon, by an acoustically-compatible solder. An acoustically-compatible solder provides advantageously low power reflections at the substrate-solder and solder-optical waveguide interfaces for acoustic waves generated by the transducer. Such propagated acoustic waves are then useable to modulate a light signal propagating in the waveguide by an acousto-optic effect.

In particular, an acoustically-compatible solder composition has a density $\rho_s$ and a physical property of enabling an acoustic wave to propagate within such composition at a certain velocity $v_s$, that produces a desired density-acoustic wave velocity product $\rho_s \cdot v_s$. A desired density-acoustic wave velocity product $\rho_s \cdot v_s$ is a value relative to corresponding density-acoustic wave velocity product values for the materials of the substrate and optical waveguide to enable acoustic waves generated by the transducer to propagate through the substrate and solder composition, and into the waveguide with sufficiently low power reflections to achieve a desired propagation efficiency. Smaller differences between such product values of the substrate, solder and waveguide materials result in lower power reflections at the material interfaces and lower propagation losses.

The use of such solder composition enables fabrication of a modulator at relatively low cost and complexity compared to the difficult to form precision grooves and Hertzian contacts of the Kino et al. patent. Furthermore, in addition to providing a propagation medium for acoustic waves directed at the waveguide, it is also possible for the acoustically-compatible solder to advantageously provide mechanical attachment of the waveguide to the substrate.

Moreover, in another aspect of the invention, it is possible to advantageously form the solder of the modulator with a surface shape that reflects and focuses acoustic waves propagating from the substrate at the optical waveguide. In such a manner, a desirable increase in the acoustic wave energy reaching the optical waveguide is achievable.

Additional features and advantages of the invention will become more readily apparent from the following detailed description and accompanying drawings.

DETAILED DESCRIPTION

An acousto-optic modulator arrangement according to the invention includes an optical waveguide, such as an optical fiber, coupled to a substrate having an acoustic transducer using an acoustically-compatible solder composition. In such an arrangement, acoustic waves generated by the transducer propagate through the substrate and solder composition and into the waveguide to modulate an optical signal propagating therein by an opto-acoustic effect.

As used herein, acoustic wave refers to an elastic non-electromagnetic wave having a frequency typically in the range from below one hertz up to tens of gigahertz. An elastic wave is a wave propagated in a medium having inertia and elasticity (the existence of forces which tend to restore any part of a medium to its original position), and in which displaced particles transfer momentum to adjoining particles and are themselves restored to their original position.

An acoustically-compatible solder is a composition possessing a density $\rho_s$ and an ability to propagate an acoustic wave at a velocity $v_s$, that produces a desired density-acoustic wave velocity product $\rho_s \cdot v_s$. In this document, the density-acoustic wave velocity product for a material will be generally referred to as the $\rho \cdot v$ product for that material. According to the invention, a desired $\rho_s \cdot v_s$ product for the solder composition is a value relative to $\rho \cdot v$ products of the corresponding substrate and optical waveguide materials to enable acoustic waves generated by the transducer to propagate through the substrate and solder, and into the waveguide with desirably low power reflections at the substrate-solder and solder-waveguide interfaces. Smaller differences between the $\rho \cdot v$ products of the respective materials result in lower power reflections at the interfaces and lower propagation losses. As a consequence, the materials for the solder, substrate and waveguide are selected with numerically close $\rho \cdot v$ products for providing sufficiently low power reflections to achieve desired propagation and modulation efficiencies.

Several different exemplary acousto-optic modulator configurations according to the invention are described below with regard to FIGS. 2 to 7. Such exemplary arrangements are for illustration purposes only and not intended to be a limitation of the invention. It is should be readily understood that numerous other modulator configurations, whether employing different acoustically-compatible solders or otherwise, can also be fabricated in accordance with the invention.

Figure 1:
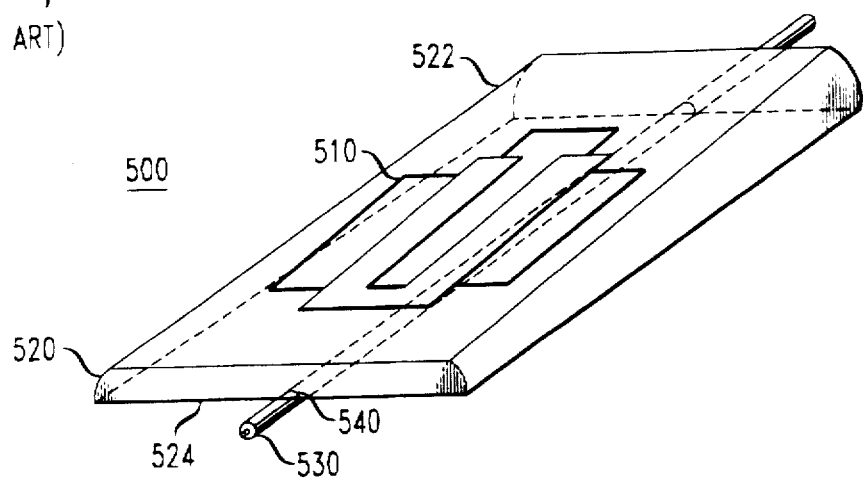
FIG. 1 is a perspective view of a prior art acousto-optic modulator.
Figure 2:
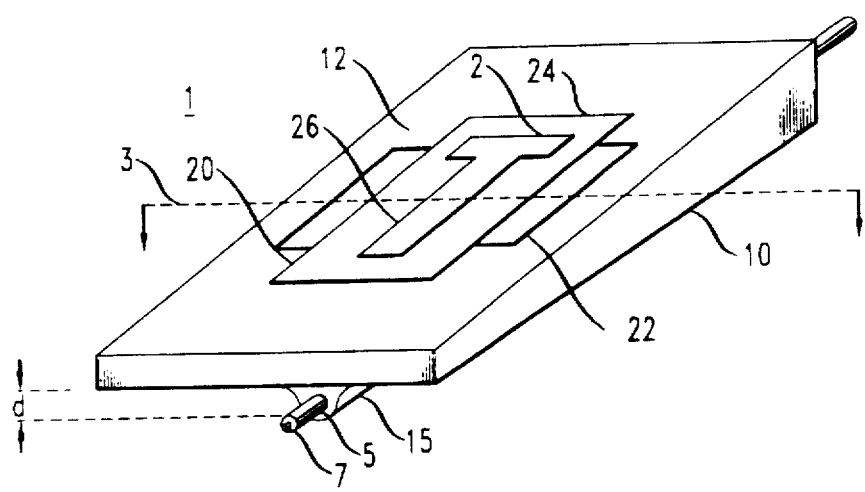
FIG. 2 is a perspective view of an exemplary acousto-optic modulator arrangement for an optical waveguide according to one embodiment of the invention.
Figure 3:
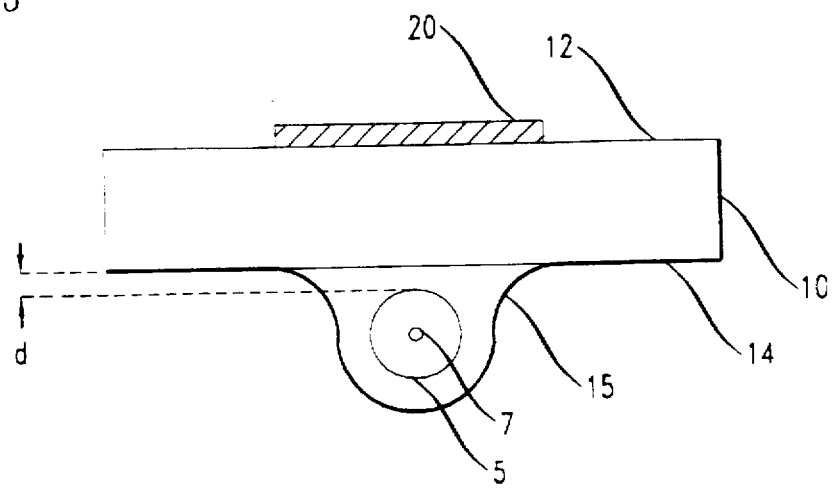
FIG. 3 is a cut-away view of the modulator arrangement of FIG. 2.

An exemplary acousto-optic modulator 1 in accordance with one embodiment of the invention is shown in FIGS. 2 and 3. FIG. 2 is a perspective view of the modulator 1 and FIG. 3 illustrates a cut-away view of the modulator 1 taken along reference line 3 of FIG. 2. Referring to FIGS. 2 and 3, the modulator 1 includes a section of an acoustic waveguide, such as an optical fiber 5, coupled to a surface 14 of a substrate 10 by an acoustically-compatible solder composition 15. A core 7 of the optical fiber 5 is also depicted. The substrate 10 is formed of a material which permits the transmission of acoustic waves therein. Suitable substrate materials include, for example, silica ($SiO_2$) glass and lithium niobate ($LiNbO_3$).

A transducer 20 is formed on a surface 12 of the substrate 10 to launch acoustic waves through the substrate 10 in a direction of the optical fiber 5. The substrate surface 12 is at an angle $\theta$ relative to the optical fiber 5. The optical fiber 5 is located at a distance d from the substrate 10 as shown in FIG. 3. Any protective optical fiber cover, such as an acrylic cover of conventional optical fibers, must be removed from the section of the optical fiber 5 coupled to the substrate 10.

It is advantageous to align the optical fiber 5 relative to the transducer 20 such that, during operation, generated acoustic waves are directed at the optical fiber 5. Numerous techniques are useable to facilitate such alignment including, for example, providing alignment marks, notches or grooves on the substrate 10 to provide an alignment reference when attaching the optical fiber 5.

The particular type of transducer used for the transducer 20 is not critical to practicing the invention as long as the transducer is capable of launching acoustic waves in the substrate 10 at the desired intensity and frequency. An exemplary transducer 20 is a zinc oxide (ZnO) transducer as depicted in FIG. 2. The ZnO transducer 20 includes a bottom electrode 22, such as copper or gold, a sputtered film 24 of ZnO having an exemplary thickness in the range of 2 µm to 5 µm, and a top electrode 26.

The dimensions of the respective transducer electrode and film layers are dependent on the particular modulator application. An exemplary dimension for the bottom electrode in the approximate range of 1 to 2 cm long along the direction of the optical fiber 5. The widths of the bottom electrode 22 and ZnO film 24 should enable a sufficient bonding surface for electrical connection to the electrode 22. Exemplary dimensions for the top electrode 26 include a length of 10 mm and a width of 80 µm. Moreover, a bond pad 28 for the top electrode 26 is provided to achieve the necessary electrical connection. Typical ZnO transducers can produce acoustic waves having frequencies in the range of 1 MHz to 1 GHz with a power typically in the range of 1 mW to 10 W. A more detailed description of ZnO transducers is provide in, for example, C. S. Tsai, *Guided Wave Acousto-Optics-Interactions, Devices, and Applications*, ch. 6, pp. 205–231 (Springer-Verlag, N.Y. 1990), which is incorporated by reference herein.

The particular modulation performed by the acousto-optical modulator 1 is not critical to practicing the invention. For example, it is possible for the modulator 1 to perform phase or intensity modulation in the manner described in the previously cited Kino et al. patent, as well as Patterson et al., "Noninvasive Switchable Acousto-Optic Taps for Optical Fiber", *J. of Lightwave Technol.*, vol. 9, no. 9, pp.1304–1312 (September 1990), which is also incorporated by reference herein. It is possible to use the modulator 1 to phase modulate a light signal propagating in a single mode optical fiber 5, when the angle θ of the substrate surface 12 is substantially 0°. Also, it is possible for the modulator 1 to provide intensity modulation of such an optical signal with a corresponding different angle θ and with a single or multi-mode optical fiber 5.

A conventional optical fiber is depicted for the optical waveguide 5 for illustration purposes only. However, the particular type of optical waveguide 5 used is not critical to practicing the invention as long as such waveguides types facilitate the modulation of a light signal propagating therein by a acousto-optical effect. Alternative types of optical waveguides useable in accordance with the invention include, for example, waveguides fabricated in glass deposited on silicon.

In accordance with the invention, the solder 15 is formed of a composition having an advantageous ρ·v product relative to the ρ·v products of the substrate 10 and the optical fiber 5. The particular desired relationship of the ρ·v products for the selected composition is dependent on acceptable acoustic wave propagation losses at the optical fiber 5 relative to generated acoustic wave power by the transducer 20 to achieve a desired modulation efficiency. Such propagation losses are partially due to power reflections caused by acoustic property mismatches occurring at the respective interfaces between the substrate 10 and the solder 15, and the solder 15 and the optical fiber 5. However, smaller differences between the ρ·v products for the substrate, solder and waveguide materials produce smaller mismatches at the and correspondingly lower acoustic wave propagation losses at the optical fiber 5.

An exemplary solder composition that is acoustically-compatible with a $SiO_2$ optical fiber 5 and $SiO_2$ or $LiNbO_3$ substrate 10 is a composition containing indium (In). Indium solders typical contain by weight 90% to 100% indium and 10% to 0% additives, such as silver (Ag). Typical values of densities ρ, acoustic wave velocities v and corresponding ρ·v products for $SiO_2$, $LiNbO_3$ and solder composition of substantially 100% In by weight are listed in the following Table I.

TABLE I

| Material | ρ (gr/cm$^3$) | v (m/sec) | ρ · v (×10$^5$ gr/sec · cm$^2$) |
|---|---|---|---|
| In | 7.3 | 2260 to 2560 | 16.5 to 18.7 |
| $SiO_2$ | 2.2 | 6000 | 13.2 |
| $LiNbO_3$ | 4.7 | 3717 | 17.8 |

Figure 4:
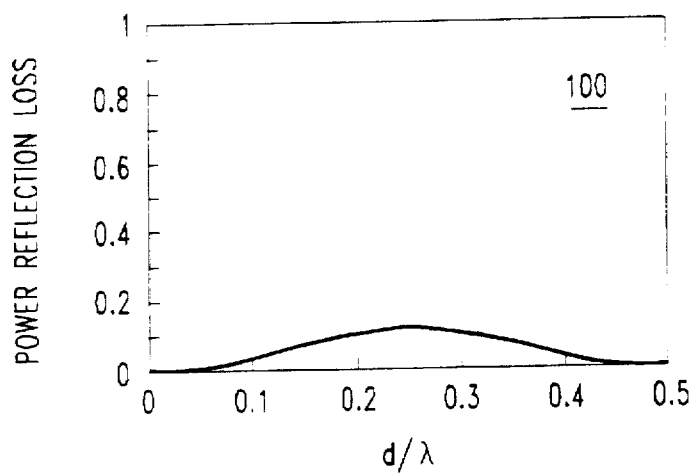
FIG. 4 illustrates a graph of an exemplary power reflection loss achievable within the modulator arrangement of FIG. 2.

Table I, the typical range of ρ·v products for the indium solder composition of 16.5×10$^5$ gr/sec·cm$^2$ and 18.7×10$^5$ gr/sec·cm$^2$ differ from the ρ · v product of $SiO_2$ of 13.2 ×10$^5$ gr/sec·cm$^2$ by approximately 22.7 % and 29.4%, respectively. Such differences in the ρ·v products of the In solder 15 and $SiO_2$ substrate 10 and fiber 5 of FIG. 2 achieves a relatively low propagation loss as shown in FIG. 4. FIG. 4 depicts a graph 100 indicating the portion of acoustic wave power that is reflected by the substrate-solder and solder-fiber transitions for the arrangement I of FIGS. 2 and 3 having an In solder composition 15 and a $SiO_2$ substrate 10 and optical fiber 5.

As shown in FIG. 4, the power reflection loss is also partially dependent on the ratio of the distance d between the optical fiber 5 and substrate 10 in FIG. 3 and the acoustic wave wavelength λ. Further, the wavelength λ is typically based on the desired acousto-optic modulation to be achieved by the modulator 1. However, exemplary wavelengths λ used in conventional acousto-optical modulators are in the range of approximately 1 μm to 10 μm. Moreover, exemplary separation distances d between the optical fiber 5 and the substrate 10 are on order of 0.1 μm to 1 mm. The previously stated ranges for the wavelength λ and the separation distance d are for illustration purposes only and not meant to be a limitation of the invention. Values outside of such ranges are useable and depend on the desired modulation and acoustic wave propagation efficiency.

In particular, FIG. 4 shows that the coupling of the $SiO_2$ substrate and optical fiber with an In solder produces a relatively low power reflection loss of approximately 15% at a ratio of d/λ equal to 2.5 and lower loss for other ratios of d/λ of less than 0.5. Such performance is achievable with the ρ·v products for the respective $SiO_2$ and In materials differing by as much as 30%. Further enhanced performance is achievable using an In solder composition 15 with a $LiNbO_3$ substrate 10 or optical fiber 5 which has a ρ·v product difference in the range of 5.7% to 9.4% as indicated in the previous Table I.

Figure 5:
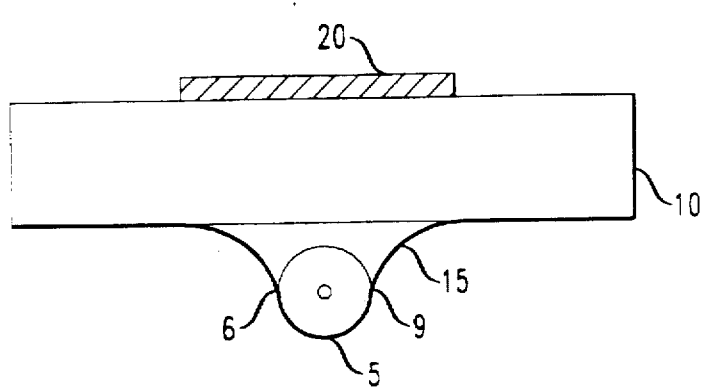
FIG. 5 is a cut-away view of a modulator arrangement according to another embodiment of the invention.

In FIGS. 2 and 3, the modulator 1 is shown with the solder composition 15 completely encapsulating the section of the fiber 5 coupled to the substrate 10. However, it is also possible to cover a smaller portion of the fiber 5 such as, for example, when the solder covers approximately half of the curved surface of the fiber 5 as is shown in FIG. 5. Similar elements of FIGS. 3 and 5 are like numbered for clarity, such as the optical fiber 5, substrate 10 and transducer 20. In accordance with the embodiment of the invention of FIG. 5, it is only necessary to adequately cover a portion of the side of the fiber 5 that provides a sufficient path for acoustic waves to enter the fiber 5 with a desired intensity. Thus, in FIG. 5, an exemplary coverage portion of the fiber 5 by the solder composition 15 that provides such a path extends to regions 6 and 9 on the surface of the optical fiber 5. Further, if the portion coverage of the optical fiber 5 by the solder 15 is insufficient for maintaining the physical attachment of the fiber 5 to the substrate 10 in the physical conditions of the operating environment, then additional restraining devices can be employed including, for example, clamps or other securing devices.

Figure 6:
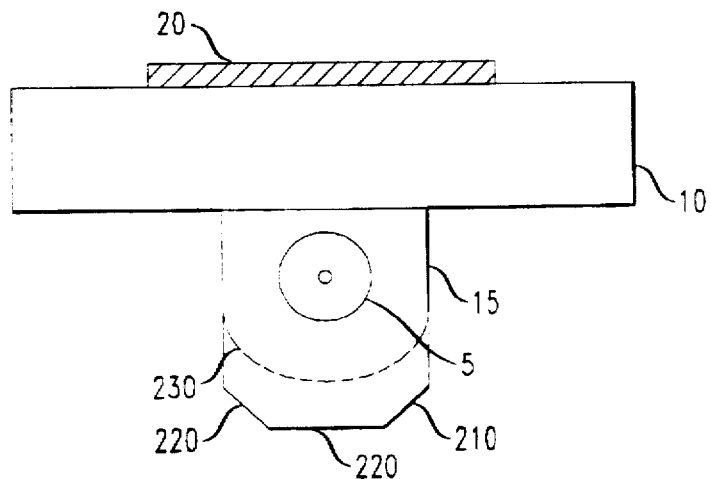
FIG. 6 is a cut-away view of a modulator arrangement according to yet another embodiment of the invention.

In the previously described embodiments shown in FIGS. 2, 3 and 5, the particular surface shape of the solder composition 15 was not critical to practicing the invention. However, in accordance with another embodiment of the invention, it is desirable to form the solder composition 15 encapsulating the section of the fiber 5 coupled to the substrate 10, as shown in FIGS. 2 and 3, and with a surface shape that advantageously reflects and optionally focuses acoustic waves propagating from the substrate 10 at the encapsulated fiber section. In such a manner, the surface of the solder substantially acts as a mirror to reflect acoustic waves reaching the surface back at the optical fiber 5. Accordingly, a desirable increase in the acoustic wave energy propagating into the optical fiber 5 is realizable. A cross-sectional view of a modulator 200 in accordance with such an embodiment of the invention is shown in FIG. 6. In FIGS. 3, 5 and 6, similar components are liked numbered for clarity, such as the optical fiber 5, substrate 10, solder composition 15 and transducer 20.

A surface 210 of the solder composition 15 is shaped such that at least a portion of acoustic waves that do not directly propagate into the optical fiber 5 are reflected from such surface in a direction of the optical fiber 5. In the modulator 200, the surface 210 includes exemplary substantially flat regions 220 that are angled relative to the optical fiber 5 and transducer 20 to reflect such acoustic waves. These three substantially flat surface regions 220 reflect portions of acoustic waves not directly propagates into the optical fiber 5.

The depiction of three substantially flat surface regions 220 to achieve such reflection is for illustration purposes only. It is possible to employ a different number of such regions, whether flat, curved or of other shapes, according to the invention for providing such reflection and focusing of acoustic waves. For instance, it is advantageous for the surface 210 to have a curved shape as indicated by dashed line 230 instead of the flat regions 220 to act like a focusing mirror of acoustic waves that reflects and focuses acoustic waves at the fiber 5.

Figure 7:
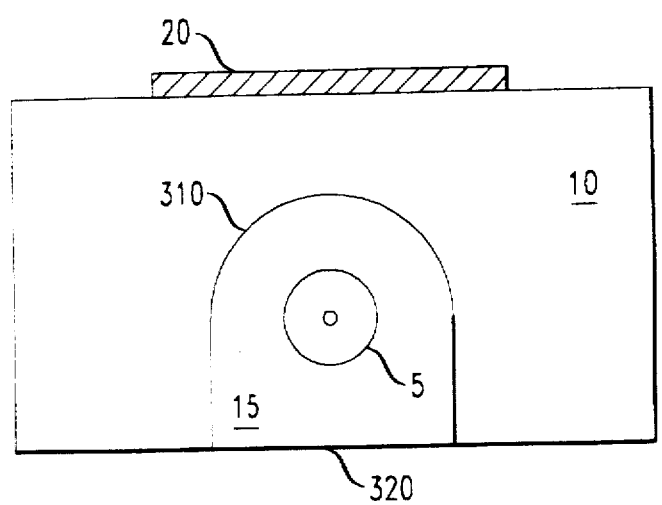
FIG. 7 is a cut-away view of a modulator arrangement according to a further embodiment of the invention.

Although the previously described embodiments of FIGS. 2, 3, 5 and 6 couple the waveguide to a flat surface of the substrate, it is alternatively possible for the waveguide 5 to be coupled by the solder within a cavity of such substrate as shown in FIG. 7. Similar components of FIGS. 3 and 7 are like numbered for clarity, including the optical fiber 5, substrate 10, and solder 15. In FIG. 7, the optical fiber 5 is positioned within a cavity 310 of the substrate 10. The solder composition 15 couples the fiber 5 to the substrate 10 to provide the advantageous acoustic path.

In addition, the solder 15 has an exposed surface 320 having an optional substantially flat shape that advantageously provides reflection of acoustic waves generated by the transducer 20 that are not directly propagated into the optical fiber 5. At least a portion of the acoustic waves that are reflected by such surface 320 propagate into the fiber 5 increasing the acoustic wave energy entering the optical fiber 5 in a similar manner to that previously described with regard to FIG. 6. In a similar manner, the optical fiber can extend through a hole in the substrate with an acoustically-compatible solder being used to couple the fiber to internal substrate surfaces defining the hole.

Although several embodiments of the invention have been described in detail above, many modifications can be made without departing from the teaching thereof. All of such modifications are intended to be encompassed within the following claims. For example, FIGS. 2, 3 and 5–7 depict exemplary embodiments of the invention having the transducer 20 formed on a substantially flat substrate surface for illustration purposes only. It is also possible for the transducer to be formed on substrate surfaces having different shapes, such as having a substantially curved cross-sectional shape to direct generated acoustic waves at a soldered optical waveguide.

Also, although the previously described embodiments employ an indium solder compositions for coupling the $SiO_2$ and $LiNbO_3$ as the materials for the substrate and optical waveguide, other materials and acoustically-compatible solder compositions are useable in accordance with the invention as long as such materials have $\rho \cdot v$ products relative to one another that achieve a desired propagation efficiency of acoustic waves into the waveguide for modulating signals transmitted therein.

The invention claimed is:

1. An acousto-optic device comprising:
   a substrate having a transducer formed thereon;
   an optical waveguide; and
   a solder composition coupling said waveguide to said substrate, said solder composition having a density $\rho$ and a physical property of enabling an acoustic wave to propagate within said composition at a velocity $v$, wherein a density-acoustic wave velocity product $\rho \cdot v$ of the composition has a value relative to corresponding density-acoustic wave velocity products for the substrate and waveguide to enable an acoustic wave generated by said transducer to propagate through said substrate and solder composition and into said waveguide with a desired propagation efficiency for modulating a light signal propagating through said waveguide.

2. The device of claim 1 wherein said density-acoustic wave velocity product $\rho \cdot v$ of said solder composition differs by no greater than approximately 30% of said density-acoustic wave velocity products of said substrate or said waveguide.

3. The device of claim 1 wherein said solder composition comprises indium.

4. The device of claim 3 wherein said solder composition is at least 90% indium by weight.

5. The device of claim 1 wherein said substrate is a $SiO_2$ substrate.

6. The device of claim 1 wherein said substrate is a $LiNbO_3$ substrate.

7. The device of claim 1 wherein said optical waveguide is a $SiO_2$ optical fiber.

8. The device of claim 1 wherein said solder composition covers a sufficient portion of a surface of a section of the waveguide coupled to said substrate to enable propagation of said acoustic waves into said waveguide to achieve said desired propagation efficiency.

9. The device of claim 8 herein said solder composition encapsulates a section of the waveguide coupled to said substrate.

10. The device of claim 9 wherein said solder composition has a surface shape that substantially reflects at least a portion of an acoustic wave generated by said transducer at said optical waveguide.

11. The device of claim 9 wherein said solder composition has a surface shape that substantially reflects and focuses at least a portion of an acoustic wave generated by said transducer at said optical waveguide.

12. The device of claim 1 wherein said solder composition couples said waveguide to an exterior surface of said substrate.

13. The device of claim 1 wherein said solder composition couples at least a section of said waveguide to said substrate within a cavity of said substrate.

14. The device of claim 1 wherein said waveguide extends through said substrate and said solder composition couples said waveguide to an internal surface of said substrate.

* * * * *